Patented Nov. 3, 1942

2,300,651

UNITED STATES PATENT OFFICE 2,300,651

PROCESS FOR THE PURIFICATION OF PECTIN

Gordon Manley Cole and Homer H. Holton, Corona, Calif., assignors to California Fruit Growers Exchange, Los Angeles, Calif., a corporation of California No Drawing. Application June 24, 1940, Serial No. 342,128

8 Claims. (Cl. 260—210)

This invention relates to an improved method of manufacturing pectin, and more particularly, to an improved method wherein the pectin is separated from an aqueous dispersion by means of metal compounds.

Since the beginning of the commercial production of pectin and even before that time, many processes for its preparation have been proposed. In general, the processes comprise three main steps, the first being the extraction of the pectin from its source material. At the present time, apple pomace and citrus fruits constitute the main commercial sources of pectin, although it may be prepared from a large number of other plant materials. The pectin may be extracted from its source material by any one of several methods, the most common of which comprises heating the source material in the presence of acidified water under carefully controlled conditions of time, temperature, and hydrogen ion concentration in order to obtain as much pectin of the highest jelly grade as is possible. An extract obtained in this manner is essentially an aqueous dispersion of the pectin. Although this aqueous dispersion may be purified and used in this form, it is customary to recover the pectin from this extract by some means of separation.

The separation of the pectin from the extract comprises the second general step in the manufacture of pectin. One method of separating the pectin from the extract involves the use of an alcohol. Since the pectin in the aqueous extract is usually only present to the extent of about 0.5% to 2%, the extract is oftentimes concentrated prior to the alcoholic precipitation in order to decrease the amount of alcohol necessary for the separation. In spite of the fact that the original pectin extract may be concentrated and thereby the amount of alcohol necessary for the separation of the pectin reduced, large volumes of alcohol are still necessary when this method of separation is used, and the concentration of the extract and recovery of the alcohol make such a process expensive. Furthermore, the alcohol separation of the pectin from the extract, whether concentrated or not, results in a product which contains relatively large percentages of impurities which are separated from the extract along with the pectin, either by reason of their being insoluble in the alcohol or as a result of mechanical occlusion in the precipitate. As a consequence, it is necessary to purify the pectin by further alcoholic treatments.

Several processes involving the use of metal compounds are in use for the separation of pectin from aqueous extracts. These methods of recovering pectin from aqueous dispersions require very careful control of many factors in order to prevent large jelly-grade losses.

The third general step in the various processes used for the manufacture of pectin involves a purification of the pectin or pectinous complexes separated from the aqueous extract. In the case of the alcohol method, this purification involves repeated washing of the pectin with comparatively large volumes of neutral or acidic alcohol, each step being followed by a draining or pressing of the pectin. When the pectin has been purified to the point at which further purification is economically infeasible, the pectin is dried and ground.

The methods which involve the separation of pectin from aqueous extracts by the use of metal compounds usually yield a product having metal or metal compounds associated with the pectin. In order to purify such pectin, it is desirable to remove the metal or metal compounds. Now, heretofore, it has always been thought absolutely necessary to dry the separated pectin or pectin complex prior to purification in the case of pectin extracted by means of metal or metal compounds. Drying the separated pectin at this stage in the process, however, must be conducted under very carefully controlled conditions in order to minimize loss of jelly grade. In spite of the most careful control at this point in the process, losses in the jelly grade of the pectin usually occur and such losses are often substantial as further explained hereinafter.

After the separated pectin or pectin complex has been dried, it has customarily been ground and then leached in an acid-alcohol bath for the purpose of removing the metal or metal compounds. Subsequent to several leachings, the pectin is usually pressed or centrifuged to remove as much alcohol as possible, and is then redried and usually reground.

The term "jelly grade" as used in this art may be defined as the number of parts by weight of sugar which one part of pectin will jellify, under standard conditions, to produce a jelly having specified characteristics. For example, one part of pectin having a jelly grade of 160 will jellify 160 parts of sugar, whereas one part of pectin having a jelly grade of 100 will jellify only 100 parts of sugar. Accordingly, pectin is sold commercially on the basis of the jelly grade, and those pectins having higher jelly grades command higher prices. It at once becomes apparent, therefore, that it is extremely important from an economic standpoint to manufacture pectin having the highest possible jelly grade, and particularly to avoid loss of jelly grade during the manufacturing process. During our studies of the various processes of manufacturing pectin, we have found that jelly-grade losses amounting to as much as 50 points or more occur, especially in the processes involving the separation of the pectin from an aqueous extract by means of metal compounds, from the time the pectin is extracted from its source material until the final product is obtained. In other words, whereas tests on the extraction liquor or pectin extract may indicate a pectin having a jelly grade of 200, the finished product obtained from this extract by these processes may have a jelly grade of only 150 or even less.

We have found, however, that it is possible to modify the processes involving the separation of pectin from an aqueous extract by means of metal compounds in such a manner as to practically eliminate jelly-grade losses. Generally stated, then, our invention consists of a method of preparing pectin which comprises important modifications of such processes as involve the purification of pectin separated from aqueous extracts by means of metal compounds. More particularly, our process rests upon the discovery that it is possible to avoid the intermediate drying step heretofore thought to be an essential requisite of methods involving separation by means of metals, and it comprises the purification of pectin which has been separated from pectin extract by means of metal compounds, and includes the steps of removing the pectin from its mother liquor and, prior to any substantial drying thereof, grinding the wet, separated pectin and subsequently leaching the wet, undried, ground pectin in alcohol. Accordingly, an object of this invention is to disclose and provide methods and means of purifying pectin substances which have been separated from pectin extracts by means of metal compounds.

Another object of this invention is to disclose and provide methods and means of purifying pectin which has been separated from an aqueous extract by means of metal compounds, wherein the pectin so separated need not be dried prior to purification, thus making the process less expensive and more expeditious by reducing the number of steps necessary.

A further object of this invention is to disclose and provide methods and means of purifying pectin without incurring any large jelly-grade loss.

A still further object of this invention is to disclose and provide methods and means of separating pectin from an aqueous extract by means of metal compounds wherein the pectin so separated is ground and repeatedly leached prior to any drying of the pectin.

Other objects and advantages of this invention will appear more fully and at large hereinafter.

It is to be understood that this invention is directed to the preparation of pectin from any suitable source material, as, for example, citrus peel, apple pomace, or other pectinous materials.

As has been stated hereinbefore, the method of this invention contemplates important modifications in those processes of recovering pectin in which the separation of the pectin from aqueous extracts is accomplished by means of metal compounds. A careful study of the literature concerned with these processes for the separation of pectin fails to give any clue as to the cause of the loss of jelly grade which seems to be inherent in these processes. However, study and effort have been devoted to the problem of the extraction of the pectin from the source material in order that a higher quality pectin may be obtained at that preliminary stage. Furthermore, considerable study has been devoted to the various means by which pectin may be separated from the aqueous extract. Nevertheless, it seems that there is a slight loss of jelly grade at both of these steps in the manufacture of pectin which apparently cannot be completely eliminated. We have found, however, that the major loss in jelly grade occurs subsequent to the separation of the pectin from the extract. In particular, we have found that when pectin is separated from an aqueous extract by means of metal compounds, as, for example, by means of aluminum hydroxide, and subsequent to that separation the pectin is dried and ground, large jelly-grade losses may occur. Since aluminum hydroxide, upon heating to relatively high temperatures, tends to become less soluble in acids, probably due to molecular rearrangement, we have reasoned that this change in molecular structure takes place to a lesser extent at lower temperatures. This being true, the aluminum hydroxide, and probably other metal compounds which are oftentimes used for the separation of pectin from aqueous extracts and which may be absorbed upon the pectin micellae, or combined with the pectin, become more difficult to remove by solution in acid media after drying. Also, the shrinking of the pectin during the drying step probably exerts a pressure effect on the metal hydroxide, or other metal compound, causing it to assume a physical structure which is not easily attacked by acid and thus decomposed and brought into solution. Furthermore, during the drying of the separated pectin, there is an increased concentration of acidic constituents and a change in the pH as the water is evaporated. It seems quite probable, therefore, that the pectin tends to become partially hydrolyzed during this period of increasing hydrogen ion concentration at the drying temperature of from 70° C. to 100° C. which is usually employed to dry the pectin at this stage.

Also, we have felt that there is the possibility of considerable enzymic degradation during the period between separation or precipitation of the pectin and the final completion of the drying. The chance for enzymic degradation would be heightened if the separated pectin were held for any appreciable time prior to the actual drying thereof. Furthermore, we conceived that it would be desirable to inactivate any enzymes present which might cause degradation of the pectin prior to or during drying.

Therefore, in spite of the fact that the prior art has taught that the pectin or pectin complex separated from an aqueous extract by means of metal compounds should be dried prior to purification, we have come to believe that the metal or metal compounds should be removed from the pectin and any active enzymes present should be inactivated prior to any drying step. In order to inactivate the enzymes and also to eliminate these metals or metal compounds while, at the same time, avoiding entirely the drying of the unpurified pectin, we conceived the possibility of washing the separated, undried pectin with an alcohol.

We have discovered for the first time that it is possible to leach successfully the tough, rubbery, curd-like precipitate in its still wet condition.

The alcohol used for the washing or leaching will contain an acid. We have found that before an efficient washing can be given to the separated pectin it is necessary to grind the wet material. Although the wet material may be ground after shrinking and hardening in the alcohol, we have found that it is not only possible but advantageous to bring the wet material prior to any treatment with alcohol, particularly since we have discovered that the wet, separated pectin may be ground much more rapidly. After grinding the wet, separated pectin, a material is obtained which lends itself much more readily to the steps of purification.

Furthermore, washing the undried, ground, separated pectin with an acidified alcohol not only removes the metals or metal compounds and inactivates the enzymes, but coloring matter and other impurities are removed before they have a chance to become intensified and fixed by the oxidation that a drying step entails. The washing of the ground, separated pectin in the wet form with acidified alcohol also tends to dehydrate the pectin and put it in a condition in which it can be more readily dried. In view of the outstanding results which we obtain as a result of our invention, we have been able to develop a new and improved process for the preparation of pectin. In accordance with our invention, therefore, we may proceed with the manufacture of pectin as follows:

Pectin which has been extracted from any suitable source material and in any way desired, may be separated from the filtered extract, either before or after concentration, by means of metal compounds. For the purpose of this example, the pectin may be separated from the extract after clarification, by means of aluminum chloride and soda ash. The precise quantities of aluminum chloride and of soda ash to be added to the pectin extract may best be determined by experimental tests upon small quantities of pectin extract. We accomplish this by adding varying quantities of the aluminum chloride and soda ash to individual samples of the pectin extract. The sample which gives the best separation and quantity of pectin indicates the correct proportions to be employed for the particular extract being tested. We have found that for pectin extracts which contain about 0.5% pectin and which have an acidity such that 10 ml. of the extract require about 1.5 ml. of 0.1 NNaOH for neutralization using phenolphthalein as an indicator, a satisfactory quantity and quality of pectin will be separated from the extract by using about 2 ml. of aluminum chloride having a concentration of 150 grams per liter for each 170 ml. of pectin extract. For the purpose of adjusting the pH, we have found that about 1.2 ml. of a 15% soda ash solution should be used for each 2 ml. of aluminum chloride solution. The above mentioned ratio of aluminum chloride to soda ash seems to give the most effective separation of pectin. However, it must be kept in mind that this ratio may vary within comparatively wide limits, depending upon the acidity of the pectin extract, the concentration of pectin in the pectin etxract, the manner and means by which the pectin extract was obtained, as well as other factors.

We have found that the above mentioned separation of pectin from a pectin extract by means of aluminum chloride and soda ash occurs most readily and completely within a pH range from about pH 4.0 to pH 4.4, although separation will occur throughout a much wider pH range. When other metal compounds are used for the separation of pectin from the pectin extract, it may be found necessary to adjust the pectin extract to within some other pH range.

The separated pectin may be removed from its mother liquor by any suitable means, as by decantation or by centrifuging. We have found it particularly advantageous to reel the separated pectin through an inclined, cylindrical, rotating screen. During the reeling process the precipitate is sprayed with water to wash away excess and occluded mother liquor. After a thorough washing, it is desirable to remove as much of the remaining water and mother liquor as possible, as by centrifuging or pressing, and without resorting to the application of heat. As has been pointed out above, those processes which heretofore have employed metal compounds for the separation of pectin have required that the pectin be dried at this stage. This requirement was based upon the reasoning that the separated pectin could not be completely purified unless changed to a finely divided state and unless its condition had been modified in the way a precipitate of this sort becomes modified by drying. The nature of this change in the state and condition of the separated pectin is explained below. In order to accomplish this change in the pectin it was first dried and then ground. In separating pectin from its extract by means of metal compounds, the separated pectin comes out with a tough, rubbery, or curd-like consistency. However, upon drying the separated pectin or pectinous complex, this characteristic is lost and the pectin never returns to that curd-like condition. It has heretofore been thought necessary to carry out this drying step and bring about this physical change and then very finely grind or powder the pectin or pectinous complex before the purification could be effected. Furthermore, it was considered that a lesser amount of alcohol would be required to carry out the purification of the pectin if the separated pectin or pectinous complex was dried and ground prior to being washed.

We have found that when the separated pectin is dried at this stage, even though drying takes place under vacuum and at relatively low temperatures, a comparatively large jelly-grade loss is incurred. Also, the step of drying and the subsequent step of grinding the pectin are both time-consuming and expensive. Although it was thought heretofore that no loss in jelly-grade of the pectin occurred by drying the separated pectin if the drying temperature was maintained below about 100° C., we have found that losses do occur to the extent of 40 to 50 jelly points.

Accordingly, we have conceived a means of purifying the pectin or pectinous complexes separated by means of metal compounds without resort to the drying step which has heretofore been thought necessary. We proceed with the purification of the still wet, curd-like, rubbery, separated pectin or pectinous complex by first reeling and pressing or centrifuging the pectin in order to remove as much wash water as possible. We have found that a hydraulic press is entirely satisfactory for this purpose. Subsequent to this pressing step, the separated pectinous complex still containing, say, about 85% moisture is disintegrated or shredded and ground in order to facilitate subsequent handling. We wish to point out at this time that it is essential that the separated pectin be disintegrated or ground in order to assure that the subsequent treatment will effect satisfactory purification.

When using a unit batch of 1200 pounds of the above-mentioned dewatered pectin or pectinous complex having a moisture content of, say, about 85%, we operate our process in the following manner. If a larger or smaller amount of pectin is being handled proper changes may be made in the ingredients.

The unit batch of 1200 pounds of dewatered pectin is suspended in about 160 gallons of 75% isopropyl alcohol to which has been added about 11 gallons of 20° Baumé hydrochloric acid. The pectin is maintained in this leach for a period of about 15 minutes, during which time it is preferably continuously agitated. The acid-alcohol leach is then drained from the pectin and 50 gallons of 75% isopropyl alcohol, preferably without acid, is used to rinse the pectin. After draining the rinsing alcohol from the pectin, a second leach may be used comprising 160 gallons of 75% isopropyl alcohol and 11 gallons of 20° Baumé hydrochloric acid. This second leach is drained from the pectin after a period of about 15 minutes, during which the batch is preferably under continuous agitation. Subsequent to the second leach the pectin is repeatedly rinsed with quantities of 75% isopropyl alcohol in order to eliminate as completely as possible the acid remaining from the acid-alcohol leach. After the pectin has received a thorough rinsing with alcohol, it is again suspended in 100 gallons of 75% isopropyl alcohol, to which has been added 9 or 10 pounds of ammonium hydroxide. This later rinse effects neutralization of the excess acidity which has not been completely removed by the alcohol rinsing above referred to. The amount of ammonium hydroxide used or the length of time of treatment required will vary with different pectins and methods of separation from the extract. In any event, we find it desirable to adjust the acidity of the batch at this point so that the pH value measured in a 1% dispersion of the finished dry product will lie within the range of about 3.2 to 3.9.

The ammoniacal alcohol rinse is drained from the pectin and two or three 15-gallon rinses of anhydrous isopropyl alcohol are applied in order to further dehydrate the pectin.

The pectin may then be dried in any suitable manner and subsequently ground to such fineness as may be desired for commercial powdered pectin. In accordance with the above process, we obtain from the 1200-pound batch of wet, unpurified pectin about 160 pounds of finished pectin containing about 5% moisture.

It is to be understood that our invention is not limited to the process which we have outlined above and used as a specific example. We have merely set forth the example for the purpose of fully illustrating our invention. We have conceived and disclosed hereinabove that it is possible to manufacture purified pectin of uniformly high jelly grade by means of a process involving the separation of a pectin or pectinous complex from an aqueous extract by means of metal compounds in such a manner that the separated pectin need not be dried prior to purification. This invention may be applied to any process which depends upon the separation of pectin from a pectin extract by means of metal compounds. Although in the above example we have used isopropyl alcohol and hydrochloric acid to effect a removal of the impurities associated with the pectin, it is to be understood that other alcohols, as, for example, methyl or ethyl alcohol, etc., and other water-miscible organic solvents may be used, and likewise that other acids such as sulfuric or nitric, as well as acetic or citric acid may be employed. Furthermore, although we have disclosed hereinbefore that ammonium hydroxide may be used to neutralize the excess acidity resulting from the acid-alcohol washes, it is to be understood that other alkaline materials may be used, as well as the salts of strong bases and weak acids, as, for example, ammonium acetate, sodium acetate, sodium citrate, or sodium carbonate.

Also, in the specific example we have mentioned the use of aluminum chloride as the metal compound which effects the separation of pectin from the pectin extract. However, it is to be understood that other metal compounds may suitably be employed, such as soluble copper salts, as, for example, copper chloride or basic copper carbonate, etc., or soluble salts of nickel, lead, silver, and iron. In fact any metal compound which has the ability to separate pectin from an aqueous dispersion or extract may be used with, of course, varying degrees of effectiveness.

Hereinabove we have referred to metal or metal compounds being removed from the pectin or pectinous complex during the treatment described. We do not wish to be understood as implying that any particular or well understood metal compounds exist as such in association with the separated pectin. We intend to include in the above expression all combinations or complexes that may actually exist under the conditions outlined.

While the process hereinabove disclosed well exemplifies our invention, it is to be understood that our invention is not limited to the process disclosed but various modifications may be made without departing from the spirit thereof. It will be found that this process for the manufacture of pectin, in which the separation of the pectin from aqueous extract is accomplished by means of metal compounds, will not only yield a product which is materially superior in quality i. e.; particularly jelly grade to such pectins formerly produced but that in addition such pectins may be produced at a substantially reduced manufacturing cost.

Having thus described our invention in such full, clear, concise, and exact language as to enable others skilled in the art to make and use the same, we claim as our invention and desire to secure by Letters Patent the following.

We claim:

1. A process for the purification of pectin which has been separated from a pectin extract by the addition of a soluble metal compound comprising the steps of removing the separated pectin from its mother liquor and, prior to any substantial drying thereof, grinding the wet, separated pectin, leaching the wet, ground pectin in alcohol acidified to an extent insufficient to hydrolyze the pectin, rinsing the leached pectin with alcohol containing a buffering material, and finally drying the pectin.

2. A process for the purification of pectin which has been separated from a pectin extract by the addition of a soluble metal compound comprising the steps of removing the separated pectin from its mother liquor and, prior to any substantial drying thereof, hardening the separated, wet pectin with an alcohol, grinding the wet, hardened pectin, and subsequently leaching the ground pectin with an alcohol acidified to an extent insufficient to hydrolyze the pectin.

3. A process for the purification of pectin which has been separated from a pectin extract by the addition of a soluble metal compound comprising the steps of removing the separated pectin from its mother liquor, and prior to any substantial drying thereof, hardening the separated, wet pectin with an alcohol, grinding the wet, hardened pectin, and subsequently leaching the ground pectin with an alcohol acidified to an extent insufficient to hydrolyze the pectin, rinsing the leached pectin with an alcohol containing a buffering material, and finally drying the pectin.

4. A process for the purification of pectin which has been separated from a pectin extract by the addition of a soluble metal compound comprising grinding the separated pectin prior to drying thereof by evaporation, and leaching the ground pectin with alcohol acidified to an extent insufficient to hydrolyze the pectin.

5. A process for the purification of pectin which has been separated from a pectin extract by the addition of a soluble metal compound comprising the steps of freeing the separated pectin of water in the substantial absence of evaporation grinding the separated pectin, and leaching the ground pectin with alcohol acidified to an extent insufficient to hydrolyze the pectin.

6. A process for the purification of pectin which has been separated from a pectin extract by the addition of a soluble metal compound comprising the steps of removing the separated pectin from its mother liquor, washing the separated pectin, compacting it to remove liquid, grinding the wet, compacted pectin, leaching the wet, ground pectin in alcohol acidified to an extent insufficient to hydrolyze the pectin, rinsing the leached pectin with alcohol containing a buffering material, and finally drying the pectin.

7. A process for the purification of pectin which has been separated from a pectin extract by the addition of a soluble metal compound comprising the steps of removing the separated pectin from its mother liquor, compacting the pectin to remove liquid therefrom, grinding the wet, compacted pectin, and leaching the wet, ground pectin in alcohol acidified to an extent insufficient to hydrolyze the pectin.

8. A process for the purification of pectin which has been separated from a pectin extract by the addition of a soluble metal compound comprising the steps of removing the separated pectin from its mother liquor, washing the separated pectin, compacting it to remove liquid, dewatering and hardening the separated, wet pectin with alcohol, grinding the wet, hardened pectin, subsequently leaching the ground pectin with an alcohol acidified to an extent insufficient to hydrolyze the pectin, rinsing the leached pectin with an alcohol containing a buffering material, and finally drying the pectin.

GORDON MANLEY COLE.
HOMER H. HOLTON.